W. A. SPEAKMAN AND J. FRASER.
MOLD TABLE.
APPLICATION FILED OCT. 15, 1920.
1,371,401. Patented Mar. 15, 1921.
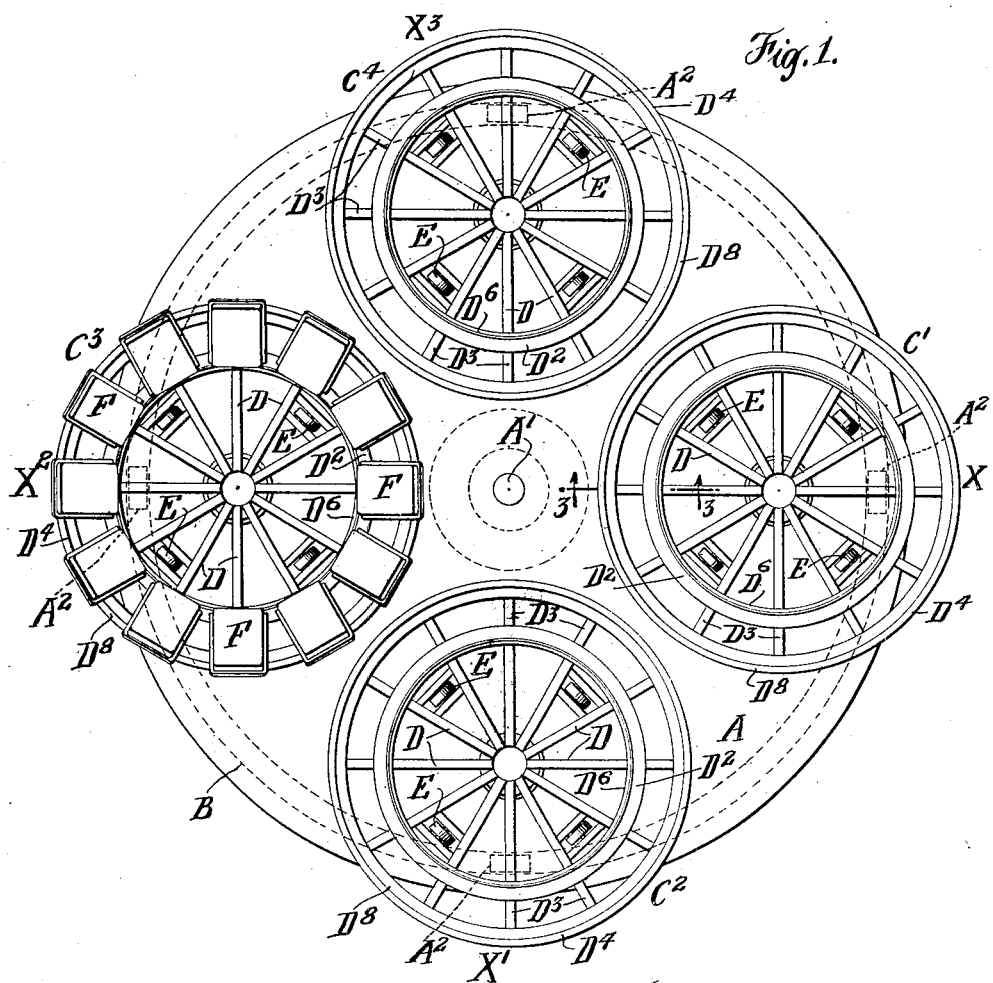
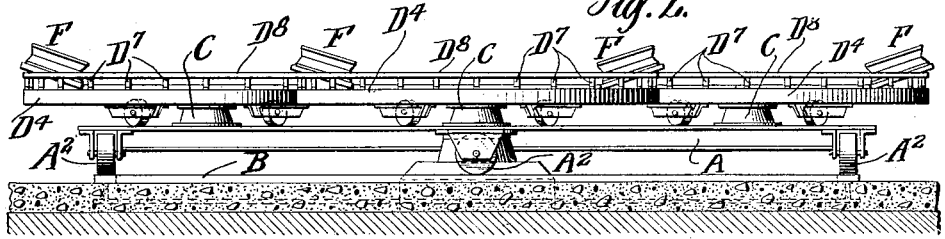
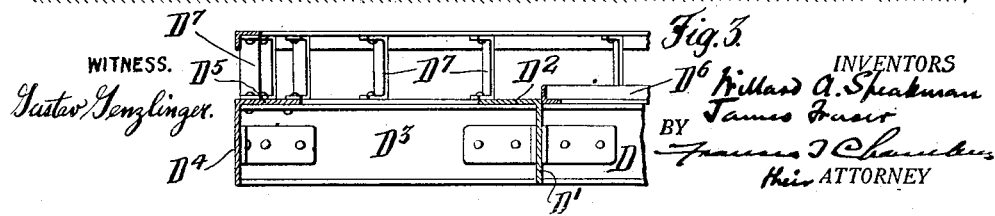

UNITED STATES PATENT OFFICE.

WILLARD A. SPEAKMAN AND JAMES FRASER, OF WILMINGTON, DELAWARE, ASSIGNORS TO SPEAKMAN COMPANY, OF WILMINGTON, DELAWARE, A CORPORATION OF DELAWARE.

MOLD-TABLE.

1,371,401.  Specification of Letters Patent.  Patented Mar. 15, 1921.

Application filed October 15, 1920. Serial No. 417,167.

*To all whom it may concern:*

Be it known that we, WILLARD A. SPEAKMAN and JAMES FRASER, residents of Wilmington, county of New Castle, State of Delaware, citizens of the United States of America, have invented certain new and useful Improvements in Mold-Tables, of which the following is a true and exact description, reference being had to the accompanying drawings, which form a part thereof.

Our invention relates to mold supporting and transporting tables and has for its object to provide a convenient and effective device for receiving the molds from the molding machine transporting them in batches to a point where they are poured in series and then transporting them to a point where the molds are removed and dumped and our invention consists in a mold supporting and transporting turntable pivotally supporting on its upper face a plurality, preferably four, turntables upon the top edge of which the molds are supported.

The nature of our improvements will be best understood as described in connection with the drawings which illustrate it and in which—

Figure 1 is a plan view of our device.

Fig. 2 a side elevation, and

Fig. 3 a sectional elevation on line 3—3 of Fig. 1.

A is the main turntable pivoted at A′ and supported by wheels A² running on a circular track B. C, C, C, C, are pivots symmetrically disposed on the top of table A and on them are pivoted the circular mold supporting tables C′, C², C³, C⁴ which, as shown, and preferably, are made up of radial angle bars D, D, etc., secured to a hub and to an annular angle plate D′, D² from which extend other angle bars D³, D³ supporting at their outer ends an annular angle plate D⁴, D⁵. From the flange D⁵ extend upright angle bars D⁷, D⁷, etc., supporting an annular angle bar D⁸. D⁶ is an annular angle bar supported on radial bars D at the inner edge of flange D². E, E, etc., are supporting wheels for tables C′, C², etc., and F, F, etc., represent molds supported on said tables which can conveniently hold twelve molds.

In operation the table A is rotated to bring one of the mold tables C′, C², etc., into a position convenient to a molding machine X for instance. The molds are placed on table C′ which is rotated to carry away a placed mold and bring a vacant place convenient to the workman until the table is filled. The filled table is then carried away and an empty table, C⁴ for instance, brought to position X. Table C′ passes first to position X′ and by a second movement of table A to position X² where the molds are poured or they can, of course, be poured at X′. After pouring, the table C′ is transported to position X³ where the molds are dumped.

It will be obvious that our device saves much handling of the molds and facilitates a rapid casting operation.

Having now described our invention, what we claim as new and desire to secure by Letters Patent, is:

1. A mold supporting and transporting table having in combination a rotary turntable and a plurality of circular mold supporting tables pivoted on the top of the turntable.

2. A mold supporting and transporting table having in combination a rotary turntable and four circular mold supporting tables symmetrically pivoted on the top of the turntable.

WILLARD A. SPEAKMAN.
JAMES FRASER.